Jan. 3, 1961   P. OOTON   2,966,938
SEAT DIVIDER AND REST
Filed May 1, 1959   2 Sheets-Sheet 1

Paige Ooton
INVENTOR.

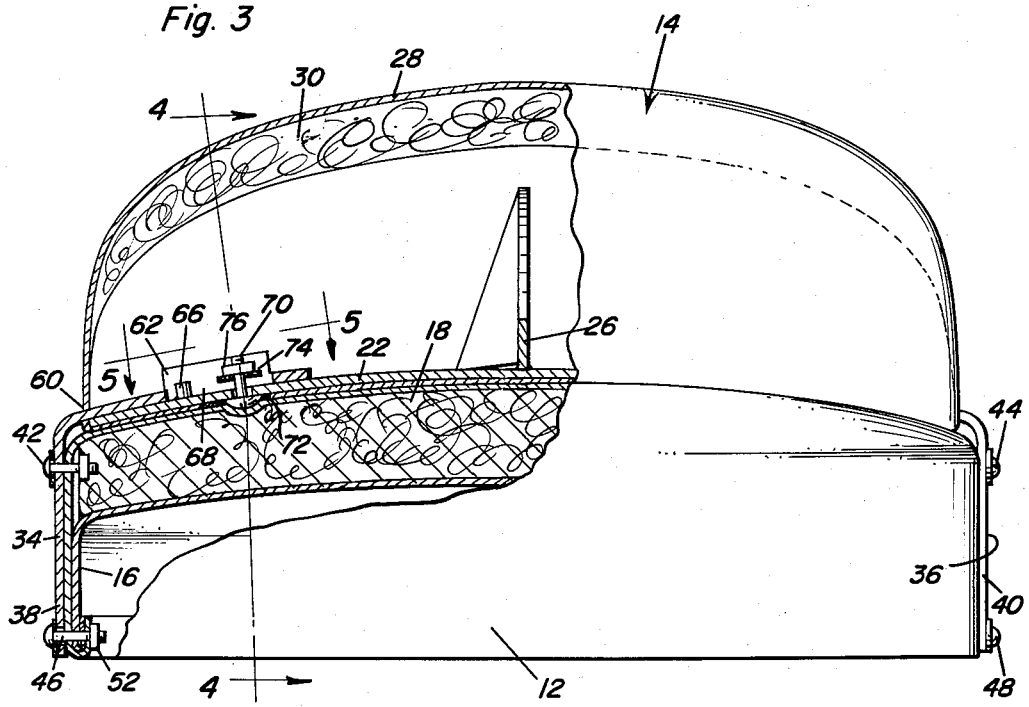
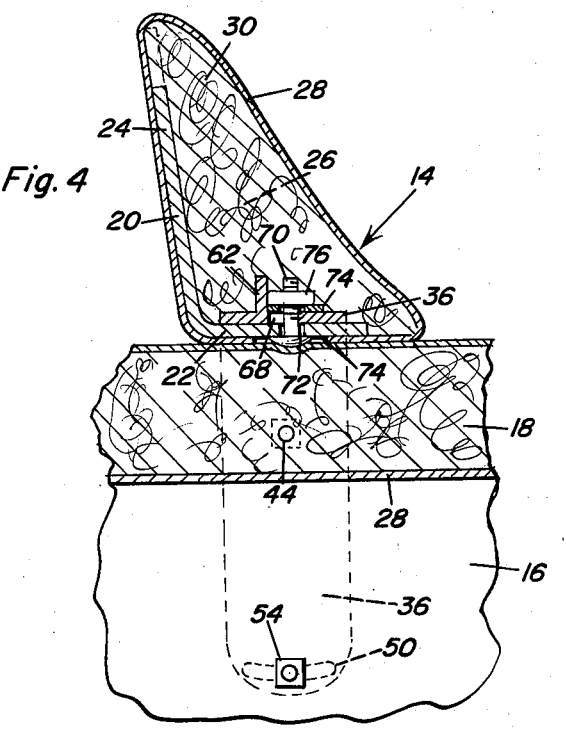
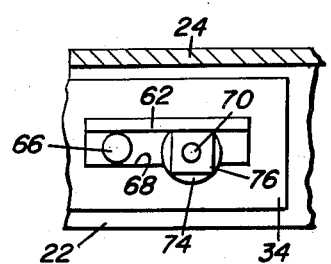

United States Patent Office 2,966,938
Patented Jan. 3, 1961

2,966,938
SEAT DIVIDER AND REST

Paige Ooton, 7th and Virginia, Hopkinsville, Ky.

Filed May 1, 1959, Ser. No. 810,314

4 Claims. (Cl. 155—5.16)

This invention relates to a seat divider and rest and more particularly to improvements in seat dividers and rests used for motorcycles or other vehicles having seats in the nature of motorcycle seats.

Briefly, the invention provides a divider in the center of the newer type large motorcycle seats, and a very important feature of the invention is that it adds to the comfort and safety of the motorcycle operator. It provides the operator with something to rest against in order to alleviate the ever present strain from his arms, hands and shoulders brought about by the motorcycle operator constantly gripping the motorcycle handle bars, striving to hold up to the position that he maintains when the machine is not in motion.

The divider provides for safety because the operator is held within reach at all times of the controls. Furthermore, the operator is not likely to crowd the passenger off of the back seat by slipping rearwardly during normal motorcycle operation.

An object of the invention is to provide an attachment for a motorcycle seat which aids the motorcycle operator to maintain his correct position on the motorcycle seat thereby promoting both safety and comfort.

Another feature of the invention is that the divider is easily attached and detached and may be adjusted for any number of different widths of seats. The divider may be tilted rearwardly or forwardly in accordance with the prerogative of the motorcycle operator.

These together with other objects and advantages which will become subsequently apparent reside in the details of construction and operation as more fully hereinafter described and claimed, reference being hed to the accompanying drawings forming a part hereof, wherein like numerals refer to like parts throughout, and in which:

Figure 3 is an enlarged elevational view of the seat, parts being broken away in section to show the connection of the seat and divider and also to show the internal construction of the divider.

Figure 4 is a sectional view taken on the line 4—4 of Figure 3.

Figure 5 is a sectional view taken on the line 5—5 of Figure 3.

Figure 1:
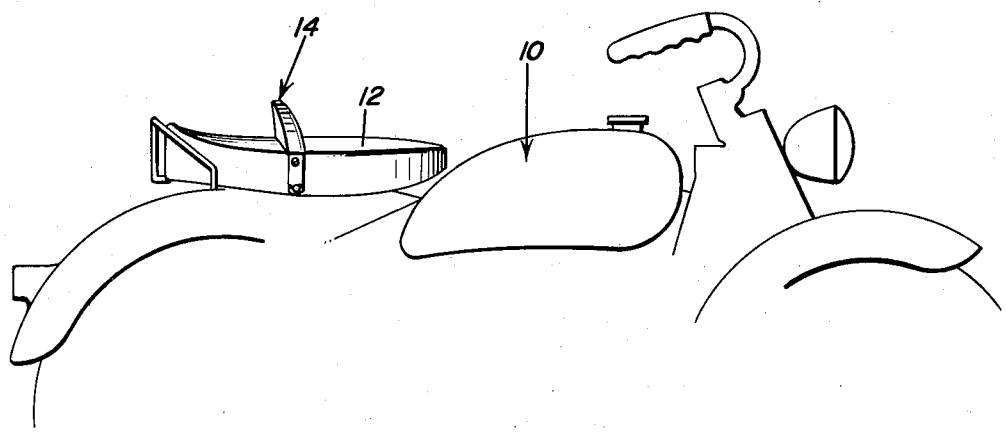
Figure 1 is a fragmentary side elevational view of a typical conventional motorcycle equipped with a comparatively large seat as is now popular and a divider in accordance with the invention.
Figure 2:
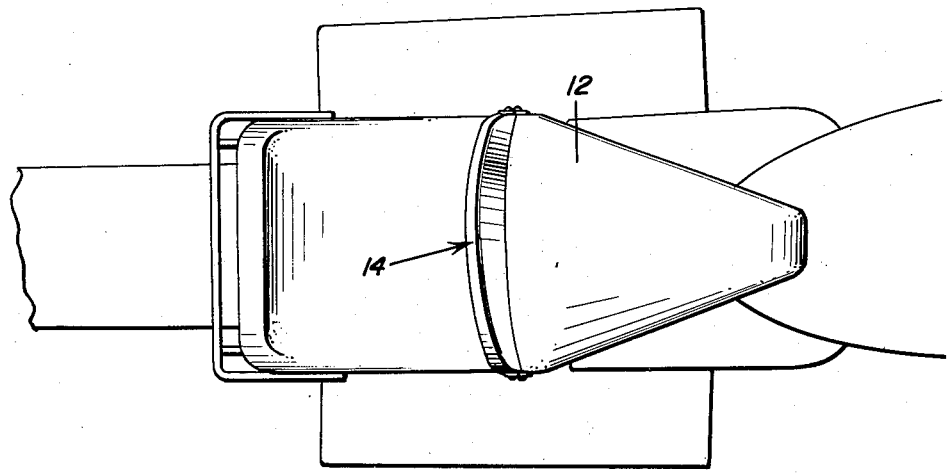
Figure 2 is a top plan view of the motorcycle seat and divider in Figure 1.

In the accompanying drawings there is a conventional motorcycle 10 fragmentarily illustrated to show the setting of the invention. The motorcycle has seat 12, the seat being conventional and diagrammatically representing any type of motorcycle seat capable of practical use with the seat divider and rest 14. Seat 12, being typical, has sides 16 and a pad 18 on which the motorcycle operator rests when using the motorcycle. The divider and rest 14 is made of an internal frame 20 having a bottom member 22 and a back member 24, together with an upstanding stiffener 26, all concealed within covering 28 and cushioned by means of padding 30. The bottom plate 22 is longitudinally smoothly curved to fit flush against the top of seat 18. As shown in Figures 1 and 2 the divider and rest 14 is located between the front and rear ends of seat 12 and extends transversely thereacross.

A very important feature of the invention is found in the various adjustments of which the divider and rest is capable. To hold the divider onto the motorcycle seat there are a pair of brackets 34 and 36 adjustably connected with the bottom plate 22 of frame 20. The brackets are approxiately L-shaped and have side portions 38 and 40 which fit flush against the outside surfaces of sides 16 of seat 12. Upper pivot bolts 42 and 44 are passed through openings in sides 38 and 40 of brackets 34 and 36 and through aligned openings in the sides 16 of the seat. The lower ends of sides 38 and 40 have bolts 46 and 48 extending through slots 50 thereof and through apertures in the sides 16. Consequently, brackets 34 and 36 may be swung through a limited arc of movement and held in place by tightening nuts 52 and 54 at the inner ends of bolts 46 and 48.

Figure 6:
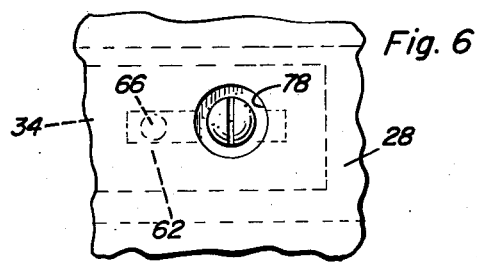
Figure 6 is a fragmentary bottom plan view taken approximately along the line 6—6 of Figure 3 and showing the means by which to achieve and adjustment of the combined divider and rest.

The upper parts of brackets 34 and 36 extend through slots 60 in the covering 28 of divider 14 and come to bear against the plate 22 of frame 20. Short upstanding stops, for instance angles 62, are fixed to plate 22, and the side edges of the brackets 34 and 36 abut the stops. The inner ends of the brackets 34 and 36 are free to move in and out of the divider 14, but the motion thereof is constrained by pins 66 which are attached to frame plate 22 and which extend through slots 68 in each of the brackets 34 and 36. There are bolts 70 also extended through the same slots 68 and through apertures 72 (Figure 3) in plate 22. An upper washer 74 is disposed on the top surface of each bracket 34 and 36, and the nuts 76 on bolts 70 have flat sides abutting a face of stop 32 so that the nuts cannot rotate upon rotation of screw or bolt 70. The heads of the bolts are located below the plate 22, and there is an access hole 78 in the bottom of covering 28 (Figure 6) so that a screw driver may be inserted to tighten or loosen the bolt 70. This, of course, would be done when the divider and rest is separated from seat 12.

It is evident from the foregoing that the brackets 34 and 36 may be laterally extended to suit different widths of seats or different portions of the same seat which may have different width stations. In addition the divider and rest may be tilted forward or rearward through the limits permitted by the length of slots 50, and tightened in place by tightening bolts 46 and 48. There is sufficient play between pins 66 and slot 68 to enable this slight adjustment to be accomplished.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A motorcycle seat attachment comprising a frame having a rear portion and a lower plate with padding on said frame, said lower plate being substantially horizontally disposed and having a contour adapted to conform to the top surfaces of a motorcycle seat, a pair of generally inverted L-shaped mounting brackets, means securing the upper horizontal legs of said brackets to opposite end portions of said lower plate with the free end portions of said legs projecting toward each other and overlapping the opposite end portions of said lower plate, the vertical legs of said mounting brackets depending from the remote ends of said horizontal legs and having means adapted to embrace and for securement to opposite sides of a motorcycle seat, said first mentioned securing means including a pair of longitudinally extending slots formed in one pair of said end portions and laterally extending pins carried by the other pair of end portions slidably disposed in said slots whose opposite ends limit movement of said mounting brackets relative to said lower plate and movement of said brackets toward and away from each other, apertures formed through said other pair of end portions spaced longitudinally from said pins and aligned with said slots, a pair of threaded and headed fasteners having their shank portions passed through said aligned apertures and slots, and threaded retaining elements engaged with said bolts for securing corresponding end portions of said horizontal legs and said lower plate in adjusted overlapped positions.

2. The combination of claim 1 wherein said embracing and securing means include aligned openings formed in the upper ends of said vertical legs adapted to receive pivot bolts therethrough and registering arcuate slots formed in the lower ends of said vertical legs each having the corresponding opening as its center point and being adapted to slidingly receive guide bolts secured to the lower portions of the opposite sides of a motorcycle seat.

3. The combination of claim 1 including vertical flanges formed on said one pair of end portions along said slots, said threaded retaining elements each having at least one outer surface complementary to and slidingly engaging the adjacent face of the corresponding flange whereby to prevent rotation of said retaining elements and to insure relative movement between the latter and said fasteners upon rotation of the latter.

4. The combination of claim 3 wherein said threaded fasteners each have a head portion for engagement by a tool to impart rotation thereto and are secured through said aligned apertures and the slots from beneath the pair of lowermost end portions whereby the head portions of said fasteners may be readily engaged by a tool upon removal of the seat attachment from a motorcycle seat.

References Cited in the file of this patent

UNITED STATES PATENTS

| | | |
|---|---|---|
| 1,457,984 | Mandel | June 5, 1923 |
| 2,007,471 | Landgrebe | July 9, 1935 |
| 2,307,709 | Ooton | Jan. 5, 1943 |
| 2,532,590 | Anastasi | Dec. 5, 1950 |
| 2,645,274 | Leach | July 14, 1953 |